US011985667B2

(12) United States Patent
Zhao

(10) Patent No.: US 11,985,667 B2
(45) Date of Patent: May 14, 2024

(54) METHOD FOR MULTIPLEXING TRANSMISSION OF INFORMATION AND APPARATUS, AND INFORMATION RECEIVING METHOD AND APPARATUS

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/052,829

(22) PCT Filed: May 10, 2018

(86) PCT No.: PCT/CN2018/086357
§ 371 (c)(1),
(2) Date: Nov. 4, 2020

(87) PCT Pub. No.: WO2019/213907
PCT Pub. Date: Nov. 14, 2019

(65) Prior Publication Data
US 2021/0144702 A1    May 13, 2021

(51) Int. Cl.
*H04W 72/21* (2023.01)
*H04W 72/0446* (2023.01)
(Continued)

(52) U.S. Cl.
CPC ....... *H04W 72/21* (2023.01); *H04W 72/0446* (2013.01); *H04W 72/0453* (2013.01); *H04W 72/23* (2023.01)

(58) Field of Classification Search
CPC ..... H04L 5/001; H04L 5/0023; H04L 5/0053; H04L 5/0055; H04L 5/0044; H04W 72/0413; H04W 72/1284
See application file for complete search history.

(56) References Cited

U.S. PATENT DOCUMENTS 8,804,636 B2    8/2014    Heo et al.
9,008,019 B2    4/2015    Kishiyama et al.
(Continued)

FOREIGN PATENT DOCUMENTS

CN    101695017 A    4/2010
CN    101932116 A    12/2010
(Continued)

OTHER PUBLICATIONS

Tracking reference signal design for phase noise compensation for SC-FDMA waveform, Guo et al., IEEE Xplore (Year: 2017).*
(Continued)

*Primary Examiner* — Yu-Wen Chang
(74) *Attorney, Agent, or Firm* — Oblon, McClelland, Maier & Neustadt, L.L.P.

(57) ABSTRACT

Aspects of the disclosure provide a method for multiplexing transmission of information and apparatus, a method for receiving information and apparatus, user equipment (UE), a base station and a computer-readable storage medium. The method for multiplexing transmission of information can include, when a physical uplink control channel (PUCCH) and a plurality of physical uplink shared channels (PUSCHs) have an overlapping portion in a time-domain, selecting, according to a selection criterion, a PUSCH for multiplexing transmission of uplink control information (UCI) carried in the PUCCH. The method can further include using the selected PUSCH for the multiplexing transmission of the UCI and transmission content of the selected PUSCH. According to the embodiments of the present disclosure, when the PUCCH and the plurality of PUSCHs have an overlapping portion in the time-domain, a suitable PUSCH can be selected for the multiplexing transmission.

10 Claims, 13 Drawing Sheets

(51) Int. Cl.
*H04W 72/0453* (2023.01)
*H04W 72/23* (2023.01)

(56) References Cited

U.S. PATENT DOCUMENTS

| | | | |
|---|---|---|---|
| 9,137,789 | B2 | 9/2015 | Kishiyama et al. |
| 9,220,112 | B2 | 12/2015 | Gong et al. |
| 9,647,815 | B2 | 5/2017 | Heo et al. |
| 9,992,007 | B2 | 6/2018 | Heo et al. |
| 10,034,275 | B2 | 7/2018 | Kim et al. |
| 2011/0268075 | A1 | 11/2011 | Heo et al. |
| 2012/0044889 | A1 | 2/2012 | Jen |
| 2012/0275417 | A1 | 11/2012 | Gong et al. |
| 2013/0028209 | A1 | 1/2013 | Kishiyama et al. |
| 2014/0369298 | A1 | 12/2014 | Heo et al. |
| 2015/0181591 | A1 | 6/2015 | Kishiyama et al. |
| 2015/0365218 | A1* | 12/2015 | Yang ............... H04L 5/0051 370/329 |
| 2016/0219618 | A1* | 7/2016 | Rico Alvarino ...... H04L 1/0027 |
| 2016/0277155 | A1* | 9/2016 | Nissilä ................. H04L 1/1812 |
| 2016/0381674 | A1 | 12/2016 | Kim et al. |
| 2017/0244534 | A1 | 8/2017 | Heo et al. |
| 2018/0006788 | A1 | 1/2018 | Lee et al. |
| 2018/0132264 | A1* | 5/2018 | Jung .................. H04L 1/1864 |
| 2018/0167932 | A1* | 6/2018 | Papasakellariou .... H04L 5/0055 |
| 2018/0167933 | A1* | 6/2018 | Yin ..................... H04L 5/0051 |
| 2018/0324793 | A1 | 11/2018 | Kim et al. |
| 2019/0037586 | A1* | 1/2019 | Park .................... H04L 5/00 |
| 2019/0141696 | A1* | 5/2019 | Kim .................. H04W 72/0413 |
| 2019/0223199 | A1* | 7/2019 | Park ................... H04W 72/1289 |
| 2019/0297618 | A1* | 9/2019 | Yang ................. H04W 72/0446 |
| 2019/0313342 | A1* | 10/2019 | Papasakellariou .... H04W 52/48 |
| 2019/0320431 | A1* | 10/2019 | Huang ................. H04L 1/1861 |
| 2019/0320469 | A1* | 10/2019 | Huang ................. H04L 5/0051 |
| 2020/0068599 | A1* | 2/2020 | Yang ................... H04L 5/0057 |
| 2020/0169958 | A1* | 5/2020 | Lee .................... H04W 52/346 |
| 2021/0045143 | A1* | 2/2021 | Ji ..................... H04L 5/0057 |
| 2021/0160901 | A1* | 5/2021 | Takeda ................ H04L 5/0044 |

FOREIGN PATENT DOCUMENTS

| | | |
|---|---|---|
| CN | 102282819 A | 12/2011 |
| CN | 102792729 A | 11/2012 |
| CN | 103152091 A | 6/2013 |
| CN | 105850057 A | 8/2016 |
| CN | 107734680 A | 2/2018 |
| EP | 3 079 272 A1 | 10/2016 |
| EP | 3 079 272 B1 | 11/2019 |
| JP | 2017-506440 A | 3/2017 |
| KR | 10-2016-0068786 A | 6/2016 |
| RU | 2 515 605 C2 | 5/2014 |
| WO | WO 2011/082682 A1 | 7/2011 |
| WO | WO 2014/097358 A1 | 6/2014 |

OTHER PUBLICATIONS

International Search Report and Written Opinion issued Jan. 8, 2019 in PCT/CN2018/086357, 7 pages.
Combined Chinese Office Action and Search Report issued Oct. 12, 2020 in corresponding Chinese Patent Application No. 201880000648.5 (with English Translation), 16 pages.
Combine Russian Federation Office Action and Search Report issued Feb. 9, 2021 in Russian Federation Patent Application No. 2020140072/07(074538) (with English translation), 14 pages.
Extended European Search Report issued Apr. 8, 2021 in European Patent Application No. 18918339.5, 7 pages.
"Remaining Issues on Carrier Aggregation" Intel Corporation, 3GPP TSG-RAN WG1 Meeting#92, 3GPP Draft: R1-1802418, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, XP051397943, Feb. 17, 2018, 5 pages.
Notification of Reason for Refusal issued May 18, 2022 in Korean Patent Application No. 10-2020-7035380 (with English language translation), 11 pages.
European Office Action issued Jun. 7, 2022 in European Patent Application No. 18918339.5, 7 pages.
Qualcomm Incorporated, "Remaining issues for multiplexing UCI on PHSCH," 3GPP TSG RAN WG1 Meeting #92bis R1-1804804, Apr. 2018, 8 pages.
Huawei, et al., "UCI piggyback on PUSCH for URLLC," 3GPP TSG RAN WG1 Meeting #92 R1-1801357, 2018, 10 pages.
Qualcomm Incorporated, "Summary of remaining issues for UCI multiplexing on PUSCH," 3GPP TSG RAN WG1 Meeting #92bis R1-1805554, Apr. 2018, 8 pages.
Indian Office Action issued Dec. 16, 2021 in Indian Patent Application No. 202047052966, 5 pages.
Japanese Office Action issued Jan. 14, 2022 in Japanese Patent Application No. 2020-563519 (with English translation), 8 pages.
"Other aspects on carrier aggregation" [online], Vivo, 3GPP TSG RAN WG1 #92b R1-1803841, Retrieved from the Internet <URL:http://www.3gpp.org/ftp/tsg_ran/WG1_RL1/TSGR1_92b/Docs/R1-1803841.zip>, Apr. 20, 2018, 6 pages.
"Remaining issues on UCI multiplexing" [online], Huawei, HiSilicon, 3GPP TSG RAN WG1 #92b R1-1803646, Retrieved from the Internet<URL:http://www.3gpp.org/ftp/tsg_ran/WG1_RL1/TSGR1_92b/Docs/R1-1803646.zip>, Apr. 20, 2018, 6 pages.
"On Remaining issues of UCI multiplexing" [online], Xiaomi Communications, 3GPP TSG RAN WG1 #93 R1 1807168, Retrieved from the Internet <URL:http://www.3gpp.org/ftp/tsg_ran/WG1_RL1/TSGR1_93/Docs/R1-1807168.zip>, May 11, 2018, 3 pages.
Korean Notice of Allowance issued on Nov. 9, 2022, in Korean Patent Application No. 10-2020-7035380, 5 pages (with English Translation).
Qualcomm Incorporated, "Summary of remaining issues for UCI piggyback on PUSCH", 3GPP TSG RAN WG1 Meeting AH 1801 R1-1801263, Vancouver, Canada, Jan. 22-26, 2018, pp. 1-5.
Qualcomm Incorporated, "Summary of remaining issues for UCI piggyback on PUSCH", 3GPP TSG RAN WG1 Meeting #92 R1-1803332, Athens, Greece, Feb. 26-Mar. 2, 2018, pp. 1-10.
3GPP TSG RAN WG1 Meeting #92bis R1-1805246, Sanya, China, Apr. 16-20, 2018, Source: Wilus Inc., Title: UCI multiplexing considering URLLC data in PUSCH, Agenda item: 7.2.4, Document for: Discussion/Decision. the whole document. 3 pages.
3GPP TSG-RAN WG1 #92bis R1-1805185, Sanya, China, Apr. 16-20, 2018, Source: Ericsson, Title: On UCI Multiplexing on PUSCH, Agenda Item: 7.1.3.2.3, Document for: Discussion and Decision. the whole document. 11 pages.
3GPP TSG RAN WG1 Meeting #92bis R1-1804173, Sanya, China, Apr. 16-20, 2018, Source: ZTE, Sanechips, Title: UCI multiplexing for URLLC, Agenda Item: 7.2.5, Document for: Discussion and Decision. the whole document. 2 pages.
3GPP TSG RAN WG1 Meeting 91 R1-1720772, Reno, USA, Nov. 27-Dec. 1, 2017, Source: Xiaomi, Title: Discussion on RE mapping for UCI multiplexing, Agenda item: 7.3.2.3, Document for: Discussion and Decision. the whole document. 3 pages.
3GPP TSG RAN WG1 Meeting 90bis R1-1717388, Prague, CZ, Oct. 9-13, 2017, Source: Intel Corporation, Title: UCI embedding and PUSCH/PUCCH multiplexing, Agenda item: 7.3.2.3, Document for: Discussion and Decision. the whole document. 7 pages.

* cited by examiner

METHOD FOR MULTIPLEXING TRANSMISSION OF INFORMATION AND APPARATUS, AND INFORMATION RECEIVING METHOD AND APPARATUS

RELATED APPLICATION

This application is a U.S. national stage of International Patent Application No. PCT/CN2018/086357 filed on May 10, 2018, the contents of which are incorporated herein by reference in its entirety.

TECHNICAL FIELD

The disclosure relates to the technical field of communications, including to a method and apparatus for multiplexing transmission of information, a method and apparatus for receiving information, user equipment, a base station and a non-transitory computer-readable storage medium.

BACKGROUND

A new generation of novel Internet applications put forward higher requirements for a wireless communication technology, driving the wireless communication technology to evolve continuously to meet the needs of the applications. A cellular mobile communication technology is in the evolution stage of a new generation of technology. In a new generation of mobile communication system, how to design improved uplink transmission to meet the needs of the system is an important subject.

Flexible configurations of multiple service types need to be supported in a New Radio (NR). Different service types have different requirements for the wireless communication technology. For example, the main requirement of enhanced Mobile Broad Band (eMBB) focuses on large bandwidth, high rate and other aspects. The main requirement of Ultra Reliable Low Latency Communication (URLLC) focuses on high reliability and low delay. The main requirement of massive Machine Type Communication (mMTC) focuses on a large number of connections. A variety of Logical Channels (LCHs) are defined in a Media Access Control (MAC) layer in order to support services with different quality of service (QoS) requirements at the same time.

Uplink control information (UCI) includes a Hybrid Automatic Repeat reQuest (HARQ) indicator, a Scheduling Request (SR) and a Channel Status Indicator (CST). The SR may be used by user equipment (UE) to apply to a base station for uplink resource scheduling. In the NR, in order to support various services with different QoS requirements, same UE may be configured with a variety of different SRs, each of which corresponds to one or more LCHs.

The UCI can be transmitted through a physical uplink control channel (PUCCH). In addition, when transmission of the HARQ indicator and the CSI on the PUCCH and transmission of uplink data on a physical uplink shared channel (PUSCH) are overlapped in time-domain (starting symbol positions are the same), UE may discard the transmission on the PUCCH and transmit the UCI including the HARQ indicator and the CSI through the PUSCH together with the uplink data. In this way, the single-carrier characteristic of uplink transmission can be ensured and a better Peak to Average Power Ratio (PAPR) and a lower Maximum Power Reduction (MPR) can be obtained.

In the last Radio Access Network (RAN) 1 meeting, it was decided that when a PUCCH and a PUSCH were overlapped only partially in time-domain and had different starting symbols, the PUCCH and the PUSCH would also conduct multiplexing transmission when they met given timing requirements. According to an existing solution, when a PUCCH and a PUSCH conduct multiplexing transmission, UE may give up the transmission on the PUCCH, and the UCI transmitted on the PUCCH and content transmitted on the PUSCH may be multiplexed and then transmitted on the PUSCH.

However, when a PUCCH and a plurality of different PUSCHs have an overlapping portion in time-domain, how to select a suitable PUSCH for multiplexing transmission is a technical problem that needs to be solved.

SUMMARY

Aspects of the disclosure provide a method for multiplexing transmission of information and apparatus, a method for receiving information and apparatus, user equipment (UE), a base station and a computer-readable storage medium are provided, in order to select a suitable PUSCH for multiplexing transmission when a Physical Uplink Control Channel (PUCCH) and a plurality of different Physical Uplink Shared Channels (PUSCHs) have an overlapping portion in time-domain.

According to a first aspect of the disclosure, a method for multiplexing transmission of information is provided. The method may be applied to UE and may include, when a PUCCH and a plurality of PUSCHs have an overlapping portion in time-domain, selecting a PUSCH for multiplexing transmission of Uplink Control Information (UCI) carried in the PUCCH according to a selection criterion, and performing multiplexing transmission by multiplexing the UCI and transmission content of the selected PUSCH in the selected PUSCH.

In an embodiment, the selecting the PUSCH for the multiplexing transmission of the UCI carried in the PUCCH according to the selection criterion may include taking a PUSCH with an earliest starting position or an earliest ending position in time-domain as the PUSCH for the multiplexing transmission of the UCI.

Additionally, the selecting the PUSCH for the multiplexing transmission of the UCI carried in the PUCCH according to the selection criterion may include, when a PUSCH of the plurality of PUSCHs is a PUSCH for uplink transmission based on downlink dynamic scheduling (DL grant) and a PUSCH of the plurality of PUSCHs is a PUSCH for uplink transmission based on configured grant, taking the PUSCH for uplink transmission based on the DL grant as the PUSCH for the multiplexing transmission of the UCI.

In an embodiment, the selecting the PUSCH for the multiplexing transmission of the UCI carried in the PUCCH according to the selection criterion may include selecting a PUSCH with a maximum number of symbols in time-domain overlapped with the PUCCH as the PUSCH for the multiplexing transmission of the UCI.

In other embodiments, the selecting the PUSCH for the multiplexing transmission of the UCI carried in the PUCCH according to the selection criterion may include selecting a PUSCH with a maximum number of resource units in an occupied time-frequency resource as the PUSCH for the multiplexing transmission of the UCI.

In a further embodiment, the selecting the PUSCH for the multiplexing transmission of the UCI carried in the PUCCH according to the selection criterion may include determining the selection criterion according to a type of the UCI and pre-stored corresponding relationships between types of UCI and different selection criteria, and selecting a PUSCH as the PUSCH for the multiplexing transmission of the UCI according to the determined selection criterion.

In an embodiment, the method may further include receiving the selection criterion or the corresponding relationships between types of UCI and different selection criteria from a base station, or agreeing the selection criterion or the corresponding relationships between types of UCI and different selection criteria with a base station.

According to a second aspect of the embodiments of the disclosure, a method for receiving information is provided. The method may be applied to a base station and may include receiving a plurality of PUSCH transmissions, determining a PUSCH for multiplexing transmission of UCI according to a selection criterion, and receiving the UCI from the determined PUSCH.

In an embodiment, the method may further include determining the selection criterion and sending the selection criterion to UE, or determining corresponding relationships between types of UCI and different selection criteria and sending the corresponding relationships between types of UCI and different selection criteria to UE, or agreeing the selection criterion or corresponding relationships between types of UCI and different selection criteria with UE.

According to a third aspect of the embodiments of the disclosure, an apparatus for multiplexing transmission of information is provided. The apparatus may be applied to UE and may include a selection module that is configured to select a PUSCH for multiplexing transmission of UCI carried in a PUCCH according to a selection criterion when the PUCCH and a plurality of PUSCHs have an overlapping portion in time-domain, and a transmission module that is configured to perform multiplexing transmission by multiplexing the UCI and transmission content of the selected PUSCH in the selected PUSCH.

In an embodiment, the selection module may include a first selection submodule that is configured to take a PUSCH with an earliest starting position or an earliest ending position in time-domain as the PUSCH for the multiplexing transmission of the UCI. In another embodiment, the selection module may include a second selection submodule that is configured to, when a PUSCH of the plurality of PUSCHs is a PUSCH for uplink transmission based on downlink dynamic scheduling (DL grant) and a PUSCH of the plurality of PUSCHs is a PUSCH for uplink transmission based on configured grant, take the PUSCH for uplink transmission based on the DL grant as the PUSCH for the multiplexing transmission of the UCI.

In a further embodiment, the selection module may include a third selection submodule that is configured to select a PUSCH with a maximum number of symbols in time-domain overlapped with the PUCCH as the PUSCH for the multiplexing transmission of the UCI. Additionally, the selection module may include a fourth selection submodule that is configured to select a PUSCH with a maximum number of resource units in an occupied time-frequency resource as the PUSCH for the multiplexing transmission of the UCI.

Further, the selection module may include a determining submodule that is configured to determine the selection criterion according to a type of the UCI and pre-stored corresponding relationships between types of UCI and different selection criteria, and a fifth selection submodule that is configured to select a PUSCH as the PUSCH for the multiplexing transmission of the UCI according to the selection criterion determined by the determining submodule.

In an embodiment, the apparatus may further include a receiving module that is configured to receive the selection criterion or the corresponding relationships between types of UCI and different selection criteria from a base station, or an agreeing module that is configured to agree the selection criterion or the corresponding relationships between types of UCI and different selection criteria with a base station.

According to a fourth aspect of the disclosure, provided is an apparatus for receiving information. The apparatus can be applied to a base station and may include a first receiving module that is configured to receive a plurality of PUSCH transmissions, a determining module that is configured to determine a PUSCH for multiplexing transmission of UCI from the plurality of PUSCHs received by the first receiving module according to a selection criterion, and a second receiving module that is configured to receive the UCI from the PUSCH determined by the determining module.

In an embodiment, the apparatus may further include a first determining and sending module that is configured to determine the selection criterion and send the selection criterion to UE, or a second determining and sending module that is configured to determine corresponding relationships between types of UCI and different selection criteria and send the corresponding relationships between types of UCI and different selection criteria to UE, or an agreeing module that is configured to agree the selection criterion or corresponding relationships between types of UCI and different selection criteria with UE.

According to a fifth aspect of the disclosure, UE is provided. The UE may include a processor and a memory that is configured to store instructions executable by the processor. The processor can be configured to select a PUSCH for multiplexing transmission of UCI carried in a PUCCH according to a selection criterion when the PUCCH and a plurality of PUSCHs have an overlapping portion in time-domain, and perform multiplexing transmission by multiplexing the UCI and transmission content of the selected PUSCH in the selected PUSCH.

According to a sixth aspect of the disclosure, a base station is provided. The base station may include a processor and a memory that is configured to store instructions executable by the processor. The processor can be configured to receive a plurality of PUSCH transmissions, determine a PUSCH for multiplexing transmission of UCI according to a selection criterion, and receive the UCI from the determined PUSCH.

According to a seventh aspect of the disclosure, provided is a non-transitory computer-readable storage medium, storing computer instructions thereon. Operations of the method for multiplexing transmission of information may be implemented when the instructions are executed by a processor.

According to an eighth aspect of the disclosure, provided is a non-transitory computer-readable storage medium, storing computer instructions thereon. Operations of the method for receiving information may be implemented when the instructions are executed by a processor.

The technical solutions provided by the embodiments of the disclosure may have beneficial effects. For example, when a PUCCH and a plurality of PUSCHs have an overlapping portion in the time-domain, a PUSCH for multiplexing transmission of UCI carried in the PUCCH may be selected according to a selection criterion. The transmission may be performed by multiplexing the UCI and the transmission content of the selected PUSCH in the selected PUSCH, so that a suitable PUSCH can be selected for the multiplexing transmission. By receiving the plurality of PUSCH transmissions, a PUSCH for the multiplexing transmission of the UCI may be determined according to the selection criterion, and the UCI may be received from the determined PUSCH, thereby receiving the UCI.

It should be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of this specification, illustrate exemplary embodiments consistent with the disclosure and together with the description serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. Implementations described in the following exemplary embodiments do not represent all implementations consistent with the disclosure. On the contrary, they are merely examples of apparatuses and methods consistent with some aspects of the disclosure as detailed in the appended claims.

Figure 1:
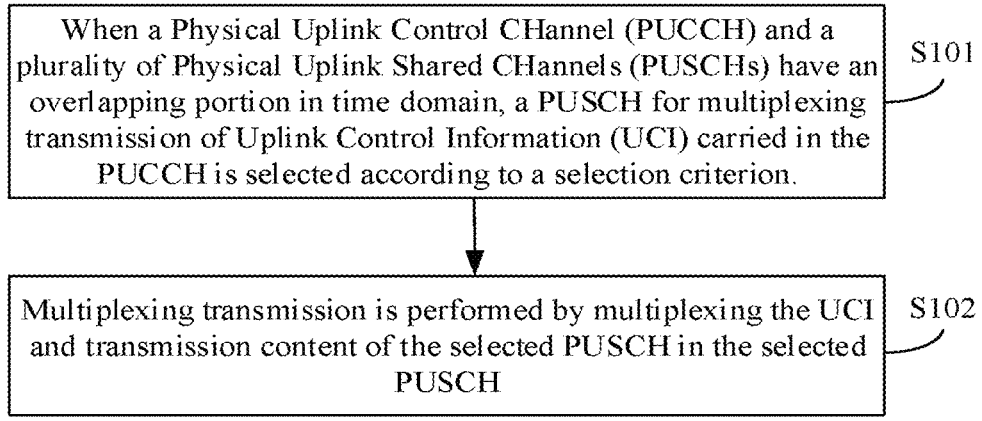
FIG. 1 is a flow diagram of a method for multiplexing transmission of information as shown in an exemplary embodiment of the disclosure.

FIG. 1 is a flow diagram of a method for multiplexing transmission of information as shown in an exemplary embodiment of the disclosure. The embodiment is described from a User Equipment (UE) side. As shown in FIG. 1, the method for multiplexing transmission of information includes the following operations.

In operation S101, when a Physical Uplink Control Channel (PUCCH) and a plurality of Physical Uplink Shared Channels (PUSCHs) have an overlapping portion in time-domain, a PUSCH for multiplexing transmission of Uplink Control Information (UCI) carried in the PUCCH is selected according to a selection criterion. Optionally, the method may further include a selection criterion sent by a base station is received, and the selection criterion may also be agreed with a base station. The selecting the PUSCH for the multiplexing transmission of the UCI carried in the PUCCH according to the selection criterion may include, but is not limited to, any of the following situations.

Figure 2A:
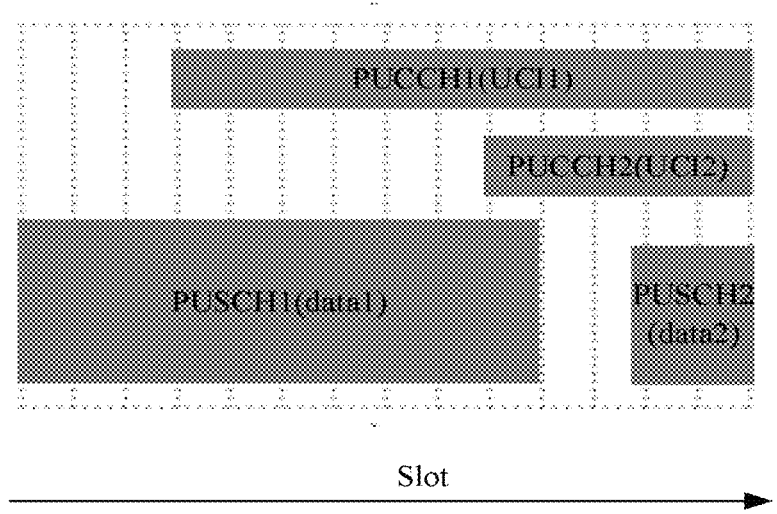
FIG. 2A is a first schematic diagram of an overlapping portion of a Physical Uplink Control Channel (PUCCH) and a plurality of Physical Uplink Shared Channels (PUSCHs) shown in an exemplary embodiment of the disclosure.
Figure 2B:
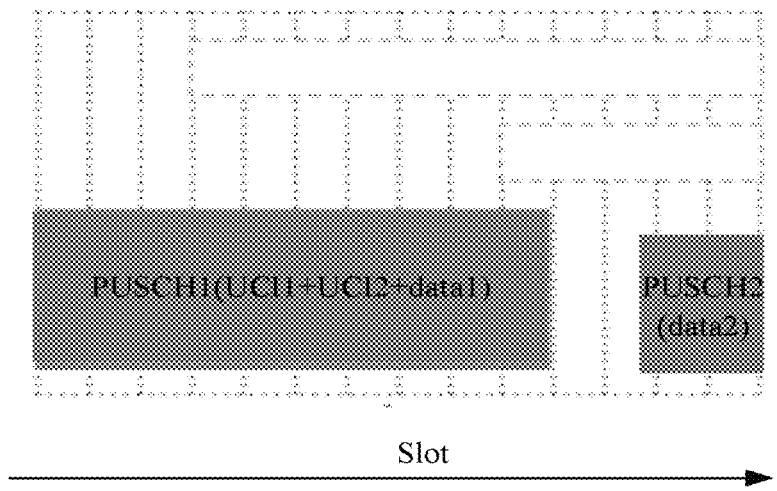
FIG. 2B is a first schematic diagram of multiplexing transmission of Uplink Control Information (UCI) through a selected PUSCH shown in an exemplary embodiment of the disclosure.

In a first scenario, a PUSCH with an earliest starting position or an earliest ending position in time-domain is taken as the PUSCH for the multiplexing transmission of the UCI. For example, as shown in FIG. 2A, it is assumed that PUCCH1 in FIG. 2A carries UCI1, PUCCH2 carries UCI2, PUSCH1 carries data 1, and PUSCH2 carries data 2. Since a starting position of PUSCH1 in time-domain is earlier than that of PUSCH2. PUSCH1 is selected as the PUSCH for the multiplexing transmission of the UCI. Both the UCI of PUCCH1 and PUCCH2 are multiplexed in the PUSCH1. As shown in FIG. 2B, UCI1, UCI2 and data 1 may be transmitted by multiplexing in the PUSCH1.

In a second scenario, when one PUSCH of the plurality of PUSCHs for uplink transmission is based on the DL grant and another PUSCH for uplink transmission is based on configured grant, a PUSCH for uplink transmission based on downlink dynamic scheduling (DL grant) is taken as the PUSCH for the multiplexing transmission of the UCI.

Figure 3A:
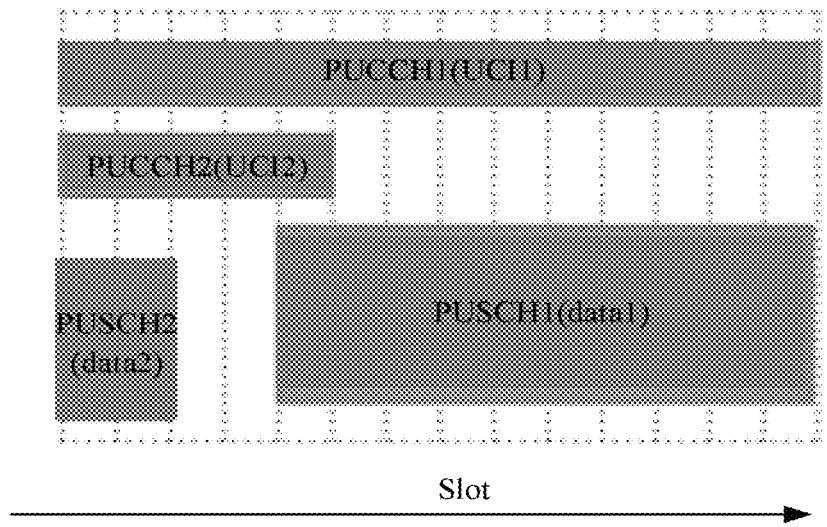
FIG. 3A is a second schematic diagram of the overlapping portion of the PUCCH and the plurality of PUSCHs shown in the exemplary embodiment of the disclosure.
Figure 3B:
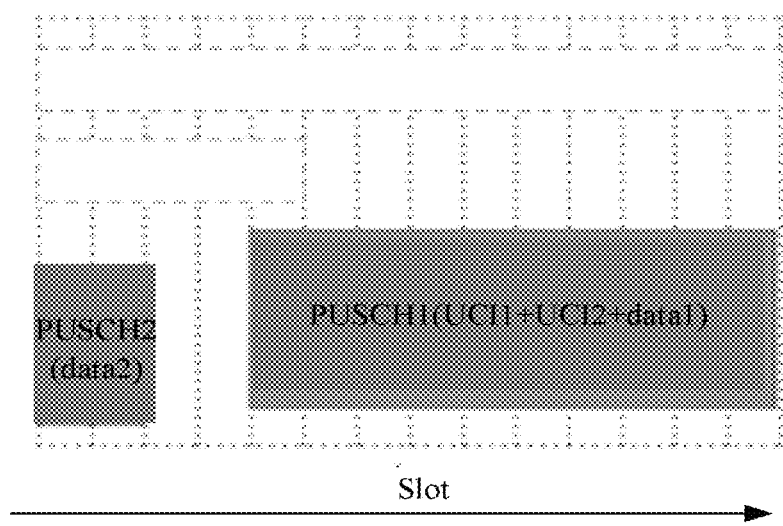
FIG. 3B is a second schematic diagram of the multiplexing transmission of the UCI in the selected PUSCH shown in the exemplary embodiment of the disclosure.

For example, as shown in FIG. 3A, it is assumed that PUCCH1 in FIG. 3A carries UCI1, PUCCH2 carries UCI2, PUSCH1 carries data 1, and PUSCH2 carries data 2, PUSCH1 is a PUSCH for uplink transmission based on DL grant, PUSCH2 is a PUSCH for uplink transmission based on configured grant. Thus, PUSCH1 may be selected as the PUSCH for the multiplexing transmission of the UCI. Both PUCCH1 and PUCCH2 may conduct multiplexing transmission of the UCI through PUSCH1. As shown in FIG. 3B, multiplexing transmission of UCI1, UCI2 and data 1 may be conducted through PUSCH1.

Figure 4A:
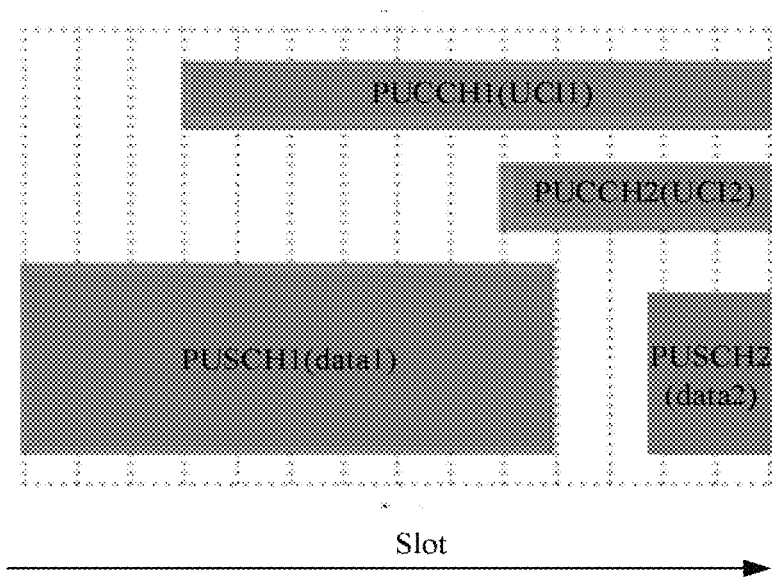
FIG. 4A is a third schematic diagram of the overlapping portion of the PUCCH and the plurality of PUSCHs shown in the exemplary embodiment of the disclosure.
Figure 4B:
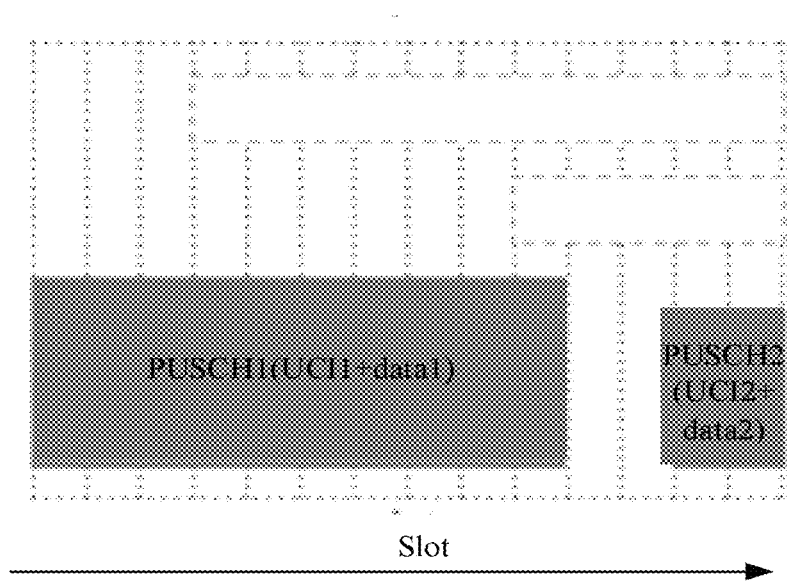
FIG. 4B is a third schematic diagram of the multiplexing transmission of the UCI in the selected PUSCH shown in the exemplary embodiment of the disclosure.

In a third scenario, a PUSCH with the maximum number of symbols in time-domain overlapped with the PUCCH is selected as the PUSCH for the multiplexing transmission of the UCI. For example, as shown in FIG. 4A, it is assumed that PUCCH1 in FIG. 4A carries UCI1, PUCCH2 carries UCI2, PUSCH1 carries data 1, and PUSCH2 carries data 2. The number of overlapped symbols in time-domain of PUCCH1 and PUSCH1 is relatively large, therefore, UCI and data 1 are transmitted by multiplexing in PUSCH1. The number of overlapped symbols in time-domain of PUCCH2 and PUSCH2 is relatively large, thus UCI2 and data 2 are transmitted by multiplexing in PUSCH2. As shown in FIG. 4B, UCI1 and data 1 may be transmitted by multiplexing in PUSCH1, and UCI2 and data 2 may be transmitted by multiplexing in PUSCH2.

Figure 5A:
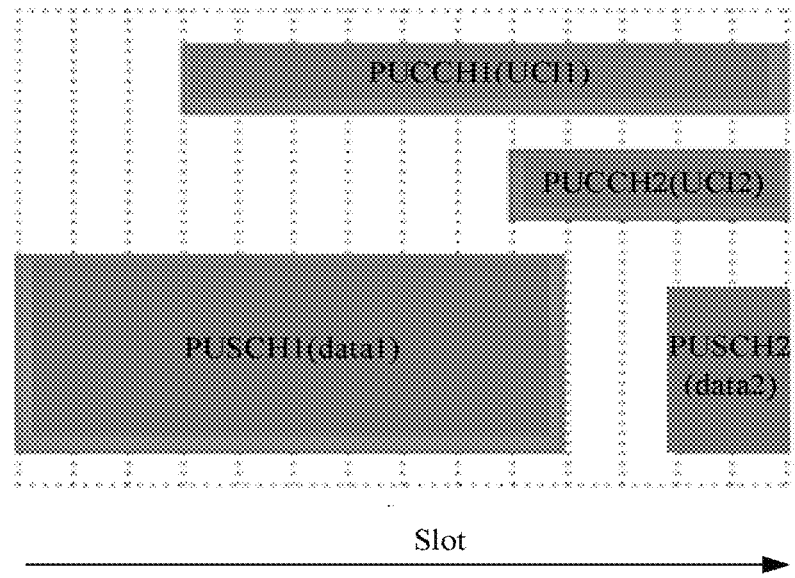
FIG. 5A is a fourth schematic diagram of the overlapping portion of the PUCCH and the plurality of PUSCHs shown in the exemplary embodiment of the disclosure.
Figure 5B:
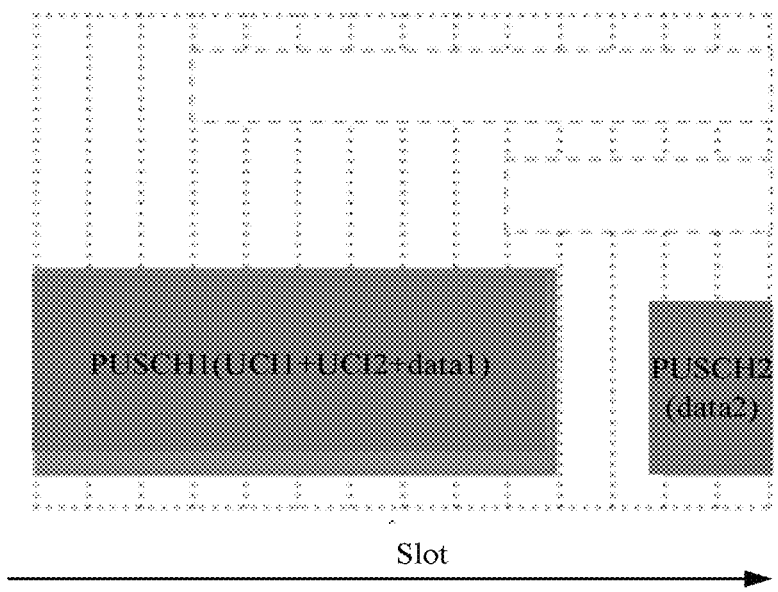
FIG. 5B is a fourth schematic diagram of the multiplexing transmission of the UCI in the selected PUSCH shown in the exemplary embodiment of the disclosure.

In a fourth scenario, a PUSCH with the maximum number of occupied resource units in a time-frequency resource is selected as the PUSCH for the multiplexing transmission of the UCI. For example, as shown in FIG. 5A, it is assumed that PUCCH1 in FIG. 5A carries UCI, PUCCH2 carries UCI2, PUSCH1 carries data 1, and PUSCH2 carries data 2. Since the number of the resource units in time-domain resource occupied by PUSCH1 is relatively large, PUSCH1 is selected as the PUSCH for the multiplexing transmission of the UCI. As shown in FIG. 5B, UCI1, UCI2 and data 1 may be transmitted by multiplexing in PUSCH1.

In a fifth scenario, a corresponding selection criterion is determined according to a type of the UCI and pre-stored corresponding relationships between types of UCI and different selection criteria. A PUSCH is selected as the PUSCH for the multiplexing transmission of the UCI according to the determined selection criterion. Optionally, the method may further include the corresponding relationships between types of the UCI and the different selection criteria sent by a base station are received, or the corresponding relationships between types of the UCI and the different selection criteria may be agreed with a base station.

Figure 6A:
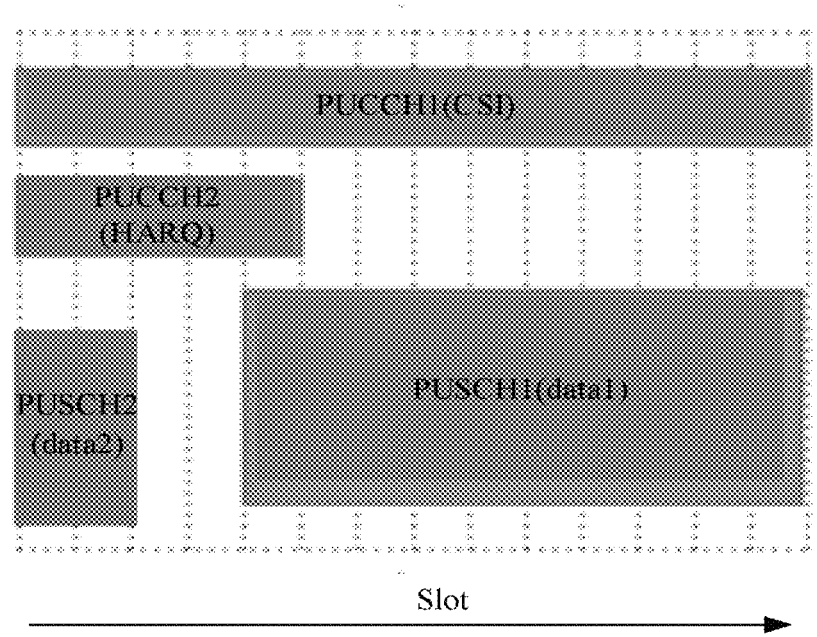
FIG. 6A is a fifth schematic diagram of the overlapping portion of the PUCCH and the plurality of PUSCHs shown in the exemplary embodiment of the disclosure.
Figure 6B:
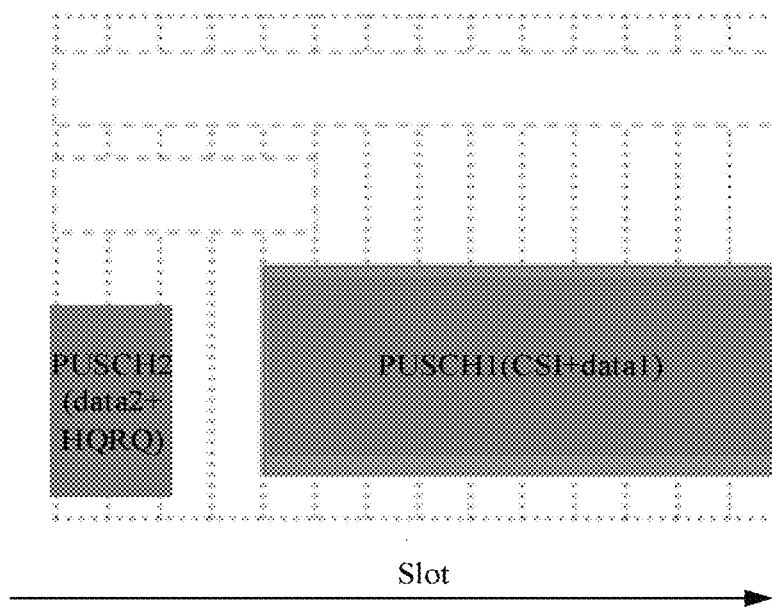
FIG. 6B is a fifth schematic diagram of the multiplexing transmission of the UCI in the selected PUSCH shown in the exemplary embodiment of the disclosure.

For example, as shown in FIG. 6A, as for feedback information which is HARQ Acknowledgement (HARQ-ACK), the PUSCH, namely PUSCH2, with the earliest starting position in time-domain may be selected for the multiplexing transmission. While as for a report message that is a channel Status Indicator (CSI), the PUSCH, namely PUSCH1, with the maximum number of occupied resource units in the time-frequency resource may be selected as the PUSCH for the multiplexing transmission. As shown in FIG. 6B, HARQ and data 2 may be transmitted by multiplexing in PUSCH2, and CSI and data 1 may be transmitted by multiplexing in PUSCH1.

In operation S102, multiplexing transmission is performed by multiplexing the UCI and transmission content of the selected PUSCH in the selected PUSCH. In the embodiment, after the selected PUSCH is determined, the multiplexing transmission may be performed by multiplexing the UCI and the transmission content of the selected PUSCH in the selected PUSCH.

According to the above embodiments, when a PUCCH and a plurality of PUSCHs have an overlapping portion in time-domain, a PUSCH for multiplexing transmission of UCI carried in the PUCCH may be selected according to a selection criterion. The selected PUSCH may be used for performing the transmission by multiplexing the UCI and the transmission content of the selected PUSCH in the selected PUSCH, and thereby a suitable PUSCH is selected for the multiplexing transmission.

Figure 7:
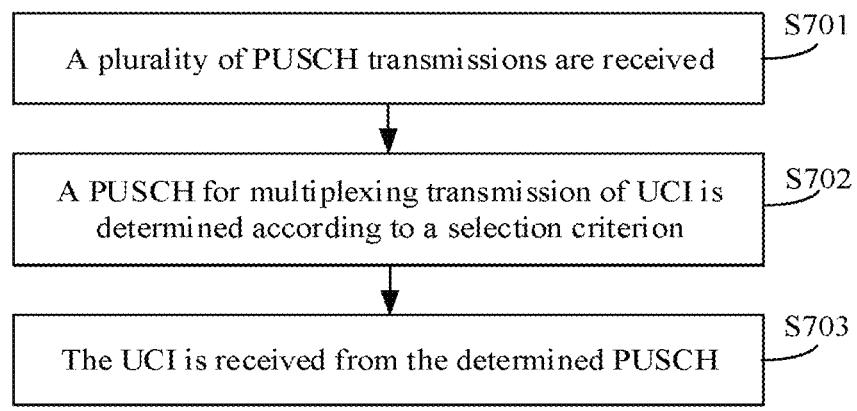
FIG. 7 is a flow diagram of a method for receiving information as shown in an exemplary embodiment of the disclosure.

FIG. 7 is a flow diagram of a method for receiving information as shown in an exemplary embodiment of the disclosure. The embodiment is described from a base station side. As shown in FIG. 7, the method includes the operations as below.

In operation S701, a plurality of PUSCH transmissions are received.

In operation S702, a PUSCH for multiplexing transmission of UCI is determined according to a selection criterion.

Optionally, the method may further include a selection criterion is determined and sent to UE, or the selection criterion can also be agreed with the UE. In the embodiment, after the selection criterion is determined or agreed, the PUSCH for the multiplexing transmission of the UCI can be determined according to the selection criterion.

In operation S703, the UCI is received from the determined PUSCH. According to the above embodiment, by receiving a plurality of PUSCH transmissions, a PUSCH for multiplexing transmission of UCI may be determined according to a selection criterion, and the UCI may be received from the determined PUSCH, thereby receiving the UCI.

Figure 8:
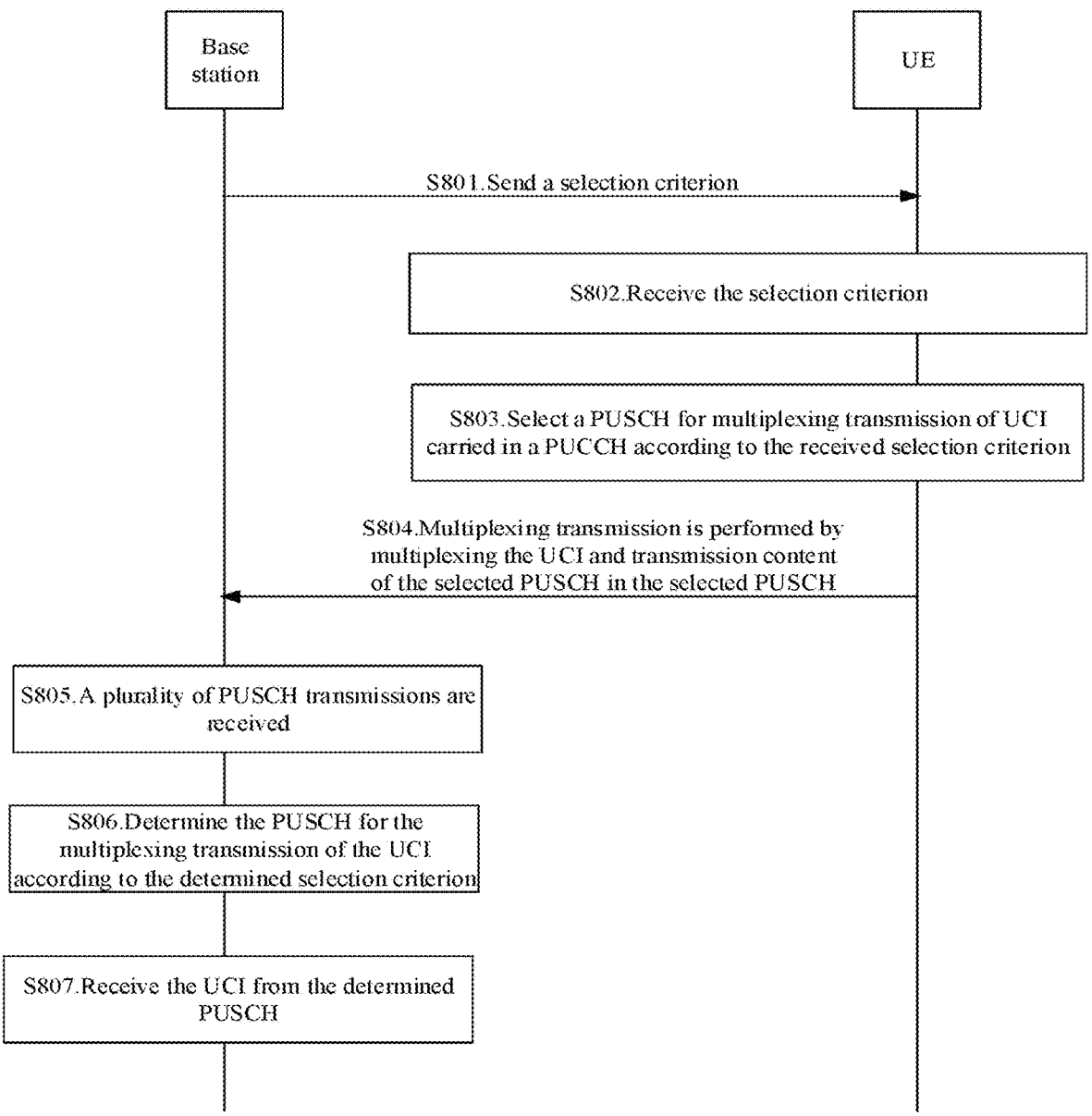
FIG. 8 is a signaling flow diagram of the method for receiving information as shown in an exemplary embodiment of the disclosure.

FIG. 8 is a signaling flow diagram of the method for receiving information as shown in an exemplary embodiment of the disclosure. The embodiment is described from the angle of interaction between a base station and UE. As shown in FIG. 8, the method includes following operations.

In operation S801, the base station determines a selection criterion and sends the selection criterion to the UE.

In operation S802, the UE receives the selection criterion.

In operation S803, when a PUCCH and a plurality of PUSCHs have an overlapping portion in time-domain, the UE selects a PUSCH for multiplexing transmission of UCI carried in the PUCCH according to the received selection criterion.

In operation S804, the UE performs the transmission by multiplexing the UCI and transmission content of the selected PUSCH in the selected PUSCH.

In operation S805, the base station receives the plurality of PUSCH transmissions.

In operation S806, the base station determines the PUSCH for the multiplexing transmission of the UCI according to the determined selection criterion.

In operation S807, the base station receives the UCI from the determined PUSCH.

According to the above embodiment, through the interaction between the base station and the UE, the UE can select a suitable PUSCH for the multiplexing transmission, and thus the base station can determine the PUSCH for the multiplexing transmission of UCI and receives the UCI from the determined PUSCH.

Figure 9:
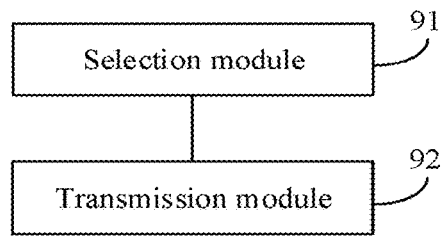
FIG. 9 is a block diagram of an apparatus for multiplexing transmission of information shown in an exemplary embodiment of the disclosure.

FIG. 9 is a block diagram of an apparatus for multiplexing transmission of information as shown in an exemplary embodiment of the disclosure. The apparatus is arranged in UE. As shown in FIG. 9, the apparatus includes a selection module 91 and a transmission module 92. Of course, it should be understood that one or more of the modules described in this disclosure can be implemented by circuitry The selection module 91 is configured to select a PUSCH for multiplexing transmission of UCI carried in a PUCCH according to a selection criterion when the PUCCH and a plurality of PUSCHs have an overlapping portion in time-domain.

The transmission module 92 is configured to perform the transmission by multiplexing the UCI and transmission content of the selected PUSCH in the PUSCH selected by the selection module 91.

In the embodiment, after the selected PUSCH is determined, the transmission may be performed by multiplexing the UCI and the transmission content of the selected PUSCH in the selected PUSCH. According to the above embodiment, when a PUCCH and a plurality of PUSCHs have an overlapping portion in the time-domain, a PUSCH for multiplexing transmission of UCI carried in the PUCCH may be selected according to a selection criterion, and the transmission may be performed by multiplexing the UCI and the transmission content of the selected PUSCH in the selected PUSCH.

Figure 10:
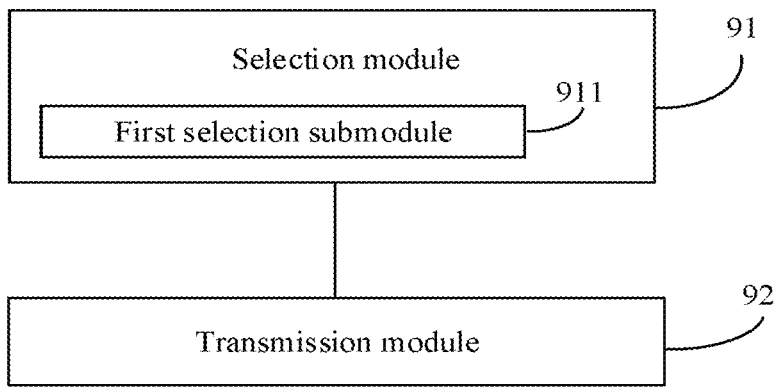
FIG. 10 is a block diagram of another apparatus for multiplexing transmission of information as shown in an exemplary embodiment of the disclosure.

FIG. 10 is a block diagram of another apparatus for multiplexing transmission of information as shown in an exemplary embodiment of the disclosure. As shown in FIG. 10, on the basis of the embodiment shown in FIG. 9 above the selection module 91 may include: a first selection submodule 911.

The first selection submodule 911 is configured to take a PUSCH with an earliest starting position or an earliest ending position in time-domain as the PUSCH for the multiplexing transmission of the UCI. For example, as shown in FIG. 2A, it is assumed that PUCCH1 in FIG. 2A carries UCI1, PUCCH2 carries UCI2, PUSCH1 carries data 1, and PUSCH2 carries data 2. Since a starting position of PUSCH1 in the time-domain is earlier than that of PUSCH2, PUSCH1 may be selected as the PUSCH for the multiplexing transmission of the UCI. Both the UCI of PUCCH1 and PUCCH2 are multiplexed in the PUSCH1. As shown in FIG. 2B, UCI1, UCI2 and data 1 may be transmitted by multiplexing in the PUSCH1.

According to the above embodiment, a PUSCH with an earliest starting position or an earliest ending position in time-domain is adopted as the PUSCH for the multiplexing transmission of the UCI, which provides a condition for subsequent multiplexing transmission of the UCI in the selected PUSCH. The implementation is simple.

Figure 11:
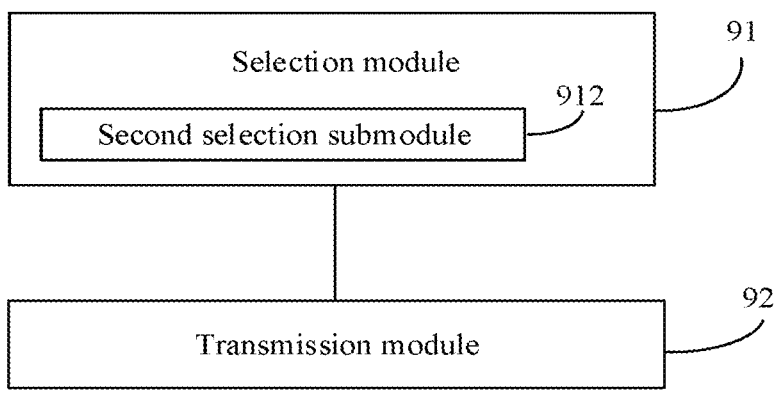
FIG. 11 is a block diagram of yet another apparatus for multiplexing transmission of information as shown in an exemplary embodiment of the disclosure.

FIG. 11 is a block diagram of yet another apparatus for multiplexing transmission of information as shown in an exemplary embodiment of the disclosure. As shown in FIG. 11, on the basis of the embodiment shown in FIG. 9 above the selection module 91 may include a second selection submodule 912.

The second selection submodule 912 is configured to take a PUSCH for uplink transmission based on DL grant as the PUSCH for the multiplexing transmission of the UCI when a PUSCH of the plurality of PUSCHs is a PUSCH for uplink transmission based on the DL grant and a PUSCH of the plurality of PUSCHs is a PUSCH for uplink transmission based on configured grant. According to the above embodiment, a PUSCH for uplink transmission based on DL grant is adopted as the PUSCH for multiplexing transmission of UCI, which provides a condition for subsequent multiplexing transmission of the UCI in the selected PUSCH. Such implementation is simple.

Figure 12:
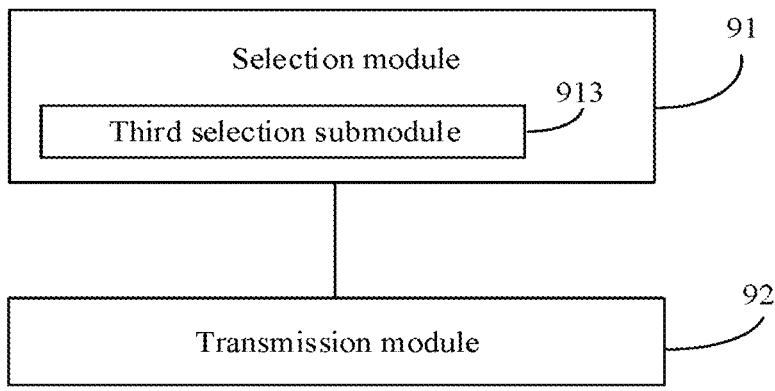
FIG. 12 is a block diagram of yet another apparatus for multiplexing transmission of information as shown in an exemplary embodiment of the disclosure.

FIG. 12 is a block diagram of yet another apparatus for multiplexing transmission of information as shown in an exemplary embodiment of the disclosure. As shown in FIG. 12, on the basis of the embodiment shown in FIG. 9 above, the selection module 91 may include a third selection submodule 913.

The third selection submodule 913 is configured to select a PUSCH with the maximum number of symbols in time-domain overlapped with the PUCCH as the PUSCH for the multiplexing transmission of the UCI. According to the above embodiment, a PUSCH with the maximum number of symbols in time-domain overlapped with the PUCCH is selected as the PUSCH for multiplexing transmission of UCI, which provides a condition for subsequent multiplexing transmission of the UCI in the selected PUSCH, The implementation is simple.

Figure 13:
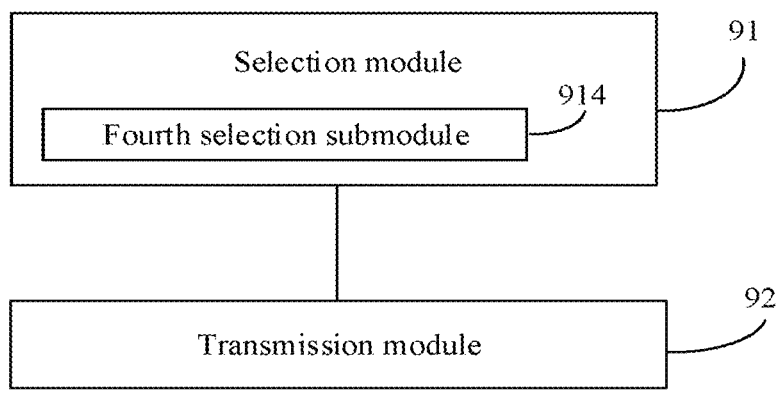
FIG. 13 is a block diagram of yet another apparatus for multiplexing transmission of information as shown in an exemplary embodiment of the disclosure.

FIG. 13 is a block diagram of yet another apparatus for multiplexing transmission of information as shown in an exemplary embodiment of the disclosure. As shown in FIG. 13, on the basis of the embodiment of the FIG. 9 above, the selection module 91 may include a fourth selection submodule 914.

The fourth selection submodule 914 is configured to select a PUSCH with the maximum number of resource units in an occupied time-frequency resource as the PUSCH for the multiplexing transmission of the UCI. According to the above embodiment, a PUSCH with the maximum number of resource units in the occupied time-frequency resource is selected as the PUSCH for multiplexing transmission of UCI, which provides a condition for subsequent multiplexing transmission of the UCI in the selected PUSCH, The implementation is simple.

Figure 14:
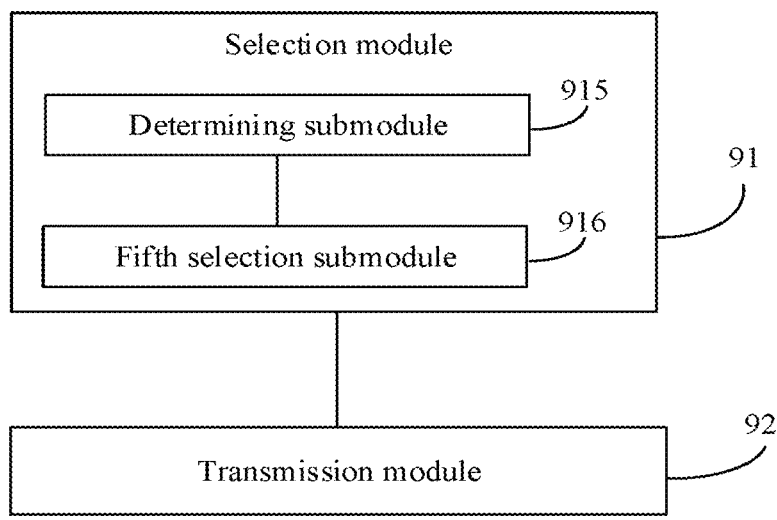
FIG. 14 is a block diagram of yet another apparatus for multiplexing transmission of information as shown in an exemplary embodiment of the disclosure.

FIG. 14 is a block diagram of yet another apparatus for multiplexing transmission of information as shown in an exemplary embodiment of the disclosure. As shown in FIG. 14, on the basis of the embodiment shown in FIG. 9 above, the selection module 91 may include a determining submodule 915 and a fifth selection submodule 916.

The determining submodule 915 is configured to determine a corresponding selection criterion according to a type of the UCI and pre-stored corresponding relationships between types of UCI and different selection criteria; and The fifth determining submodule 916 is configured to select a PUSCH as the PUSCH for the multiplexing transmission of the UCI according to the selection criterion determined by the determining submodule 915.

According to the above embodiment, a PUSCH may be selected as the PUSCH for multiplexing transmission of UCI according to a determined selection criterion, which provides a condition for subsequent multiplexing transmission of the UCI in the selected PUSCH, The an implementation is simple.

Figure 15:
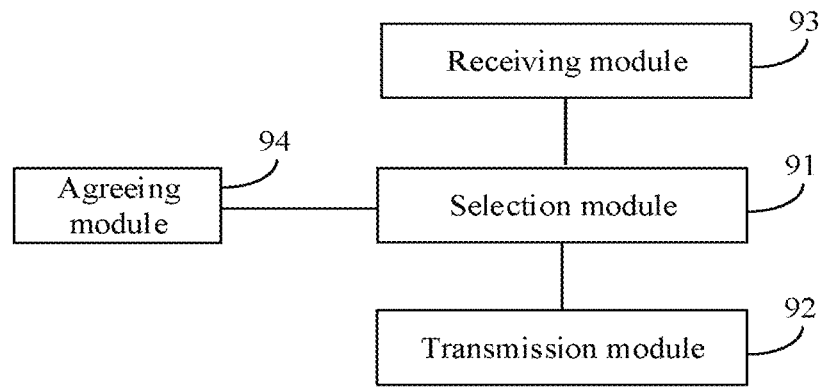
FIG. 15 is a block diagram of yet another apparatus for multiplexing transmission of information as shown in an exemplary embodiment of the disclosure.

FIG. 15 is a block diagram of yet another apparatus for multiplexing transmission of information as shown in an exemplary embodiment of the disclosure. As shown in FIG. 15, on the basis of the embodiment shown in FIG. 9 above, the apparatus may further include a receiving module 93 or an agreeing module 94.

The receiving module 93 is configured to receive the selection criterion or the corresponding relationships between types of UCI and different selection criteria from a base station. The agreeing module 94 is configured to agree the selection criterion or the corresponding relationships between types of UCI and different selection criteria with the base station. According to the above embodiment, the selection criterion may be determined or agreed, which provides a condition for subsequent selection of the PUSCH for the multiplexing transmission of the UCI according to the selection criterion.

Figure 16:
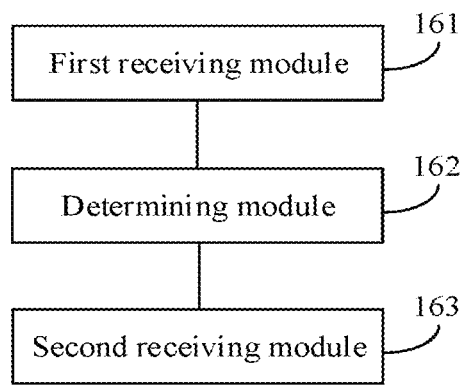
FIG. 16 is a block diagram of an apparatus for receiving information as shown in an exemplary embodiment of the disclosure.

FIG. 16 is a block diagram of an apparatus for receiving information as shown in an exemplary embodiment of the disclosure. The apparatus can be located in a base station. As shown in FIG. 16, the apparatus includes a first receiving module 161 that is configured to receive of a plurality of PUSCH transmissions, a determining module 162 that is configured to determine a PUSCH for multiplexing transmission of UCI from the plurality of PUSCHs received by the first receiving module 161 according to a selection criterion, and a second receiving module 163 that is configured to receive the UCI from the PUSCH determined by the determining module.

According to the above embodiment, upon receiving a plurality of PUSCH transmissions, a PUSCH for multiplexing transmission of UCI may be determined according to a selection criterion, and the UCI may be received from the determined PUSCH, thereby receiving the UCI.

Figure 17:
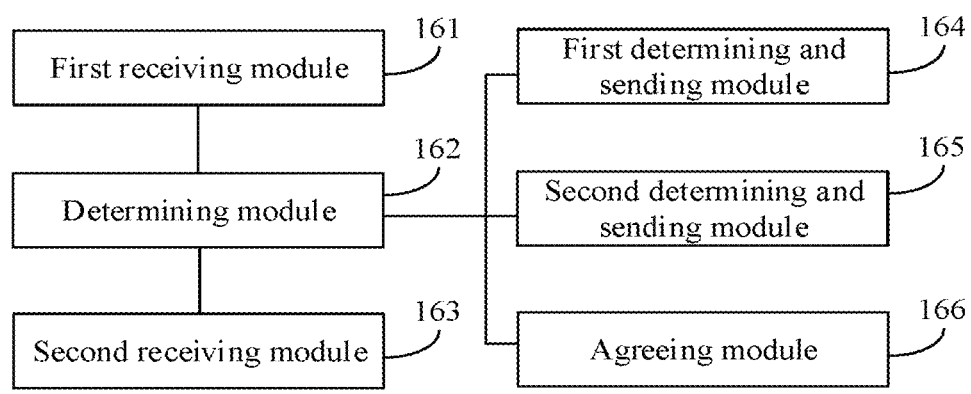
FIG. 17 is a block diagram of another apparatus for receiving information as shown in an exemplary embodiment of the disclosure.

FIG. 17 is a block diagram of another apparatus for receiving information as shown in an exemplary embodiment of the disclosure. As shown in FIG. 17, on the basis of the embodiment shown in FIG. 16 above, the apparatus may further include a first determining and sending module 164, a second determining and sending module 165 or an agreeing module 166.

The first determining and sending module 164 is configured to determine the selection criterion and send the selection criterion to UE. The second determining and sending module 165 is configured to determine corresponding relationships between the type of the UCI and different selection criteria and send the corresponding relationships between types of UCI and different selection criteria to the UE. The agreeing module 166 is configured to agree the selection criterion or the corresponding relationships between types of UCI and different selection criteria with the UE.

According to the above embodiment, a selection criterion may be determined and sent to UE or may be agreed with the UE, which enables the UE to select a PUSCH for multiplexing transmission of UCI according to the selection criterion.

Figure 18:
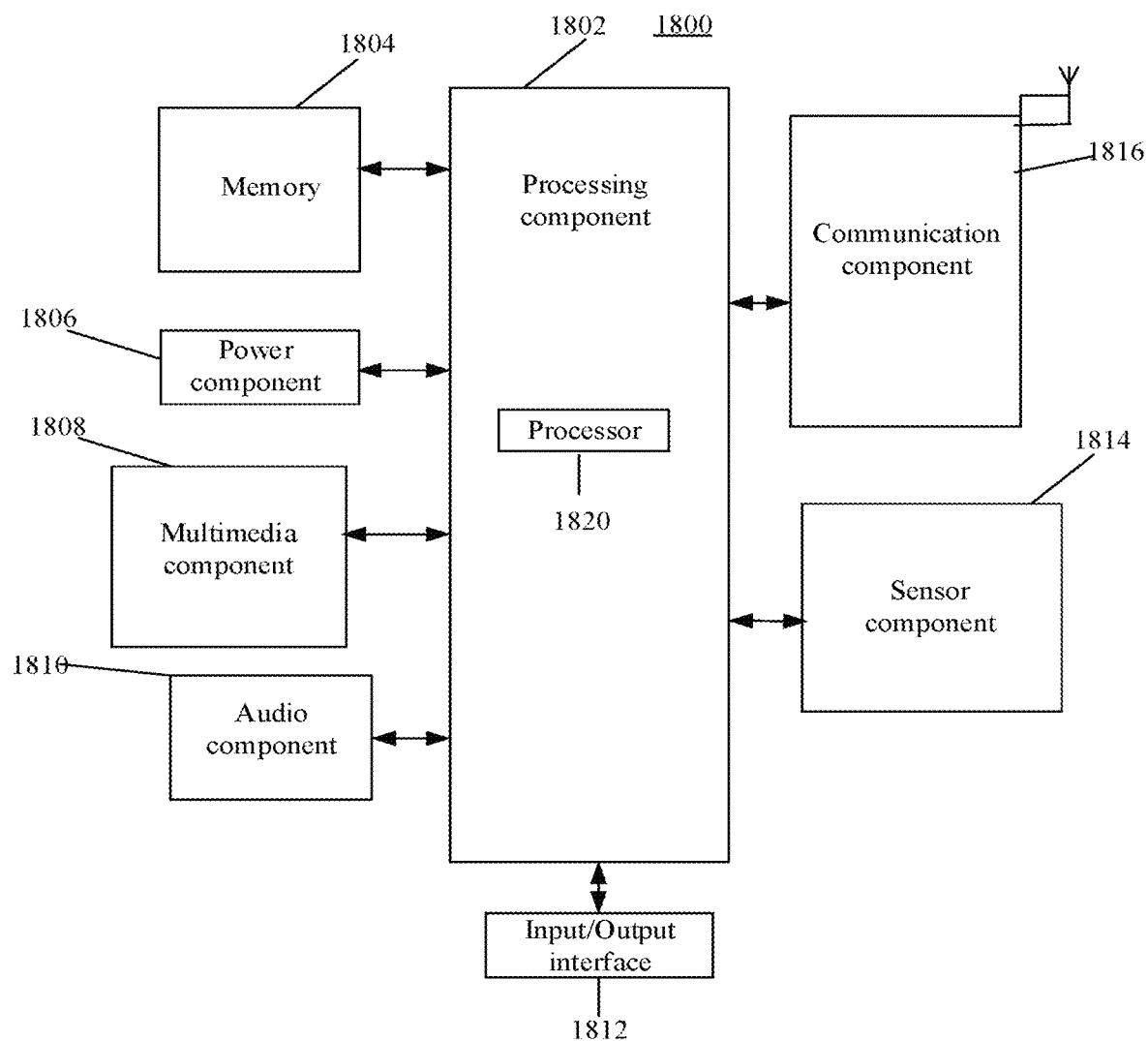
FIG. 18 is a block diagram of an apparatus suitable for multiplexing transmission of information as shown in an exemplary embodiment of the disclosure.

FIG. 18 is a block diagram of an apparatus suitable for multiplexing transmission of information as shown in an exemplary embodiment of the disclosure. For example, the apparatus 1800 may be user equipment such as a mobile phone, a computer, a digital broadcasting terminal, a message transceiver, a game console, tablet equipment, medical equipment, fitness equipment, and a personal digital assistant.

Referring to FIG. 18, the apparatus 1800 may include one or more of the following components: a processing component 1802, a memory 1804, a power component 1806, a multimedia component 1808, an audio component 1810, an Input/Output (I/O) interface 1812, a sensor component 1814, and a communication component 1816.

The processing component 1802 generally controls overall operations of the apparatus 1800, such as operations related to displaying, telephone calls, data communications, camera operations, and recording operations. The processing component 1802 may include one or more processors 1820 to execute instructions, so as to complete all or part of the operations of the method described above. In addition, the processing component 1802 may include one or more modules to facilitate the interaction between the processing component 1802 and other components. For example, the processing component 1802 may include a multimedia module to facilitate the interaction between the multimedia component 1808 and the processing component 1802.

One of the processors 1820 of the processing component 1802 may be configured to select a PUSCH for multiplexing transmission of UCI carried in a PUCCH according to a selection criterion when the PUCCH and a plurality of PUSCHs have an overlapping portion in time-domain, and perform multiplexing transmission by multiplexing the UCI and transmission content of the selected PUSCH in the selected PUSCH.

The memory 1804 is configured to store various types of data to support the operation of the apparatus 1800. Examples of such data include instructions for any application program or method operated on the apparatus 1800, contact data, phone book data, messages, pictures, videos, and the like. The memory 1804 may be implemented by any type of volatile or non-volatile storage devices or a combination thereof, such as a Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1806 is configured to provide power for various components of the apparatus 1800. The power component 1806 may include a power management system, one or more power supplies, and other components associated with generating, managing, and distributing power for the apparatus 1800.

The multimedia component 1808 may include a screen providing an output interface between the apparatus 1800 and a user. In some embodiments, the screen may include an LCD and a TP. If it includes the TP, the screen may be implemented as a touch screen to receive an input signal from a user. The TP includes one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 1808 includes a front camera and/or a rear camera. The front camera and the rear camera may receive external multimedia data while the apparatus 1800 is in an operation mode, such as a photographing mode or a video mode. Each of the front camera and rear camera may be a fixed optical lens system or may have focal lengths and optical zoom capabilities.

The audio component 1810 is configured to output and/or input audio signals. For example, the audio component 1810 includes a microphone (MIC), and the microphone is configured to receive an external audio signal when the apparatus 1800 is in an operation mode, such as a calling mode, a recording mode, and a voice identification mode. The received audio signals may be further stored in the memory 1804 or transmitted via the communication component 1816. In some embodiments, the audio component 1810 may further include a speaker to output audio signals.

The I/O interface 1812 is configured to provide an interface between the processing component 1802 and peripheral interface modules, which may be keyboards, click wheels, buttons, etc. These buttons may include, but are not limited to: a home button, a volume button, a start button, and a lock button.

The sensor component 1814 may include one or more sensors configured to provide various aspects of state assessment for the apparatus 1800. For example, the sensor component 1814 may detect an on/off status of the apparatus 1800, and relative positioning of components. For example, the component is a display and a keypad of the apparatus 1800. The sensor component 1814 may also detect a change in position of the apparatus 1800 or a component of the apparatus 1800, presence or absence of user contact with the apparatus 1800, an orientation or an acceleration/deceleration of the apparatus 1800, and a change in temperature of the apparatus 1800. The sensor component 1814 may include a proximity sensor configured to detect the presence of objects nearby without any physical contact. The sensor component 1814 may also include light sensors, such as CMOS or CCD image sensors, for use in imaging applications. In some embodiments, the sensor component 1814 may also include an acceleration sensor, a gyroscope sensor, a magnetic sensor, a pressure sensor, or a temperature sensor.

The communication component 1816 is configured to facilitate wired or wireless communications between the apparatus 1800 and other devices. The apparatus 1800 may access a wireless network based on any communication standard, such as Wi-Fi, 2G or 6G, or a combination thereof. In an exemplary embodiment, the communication component 1816 receives a broadcast signal or broadcast related information from an external broadcast management system via a broadcast channel. In one exemplary embodiment, the communication component 1816 further includes a Near Field Communication (NFC) module to promote short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In the exemplary embodiment, the apparatus 1800 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In the exemplary embodiment, a non-transitory computer-readable storage medium storing instructions, such as the memory 1804 storing instructions, is further provided. The above instructions may be executed by the processor 1820 of the apparatus 1800 to complete the foregoing method. For example, the non-transitory computer-readable storage medium may be a Read Only Memory (ROM), a Random Access Memory (RAM), a CD-ROM, a magnetic tape, a floppy disc, an optical data storage device, and the like.

Figure 19:
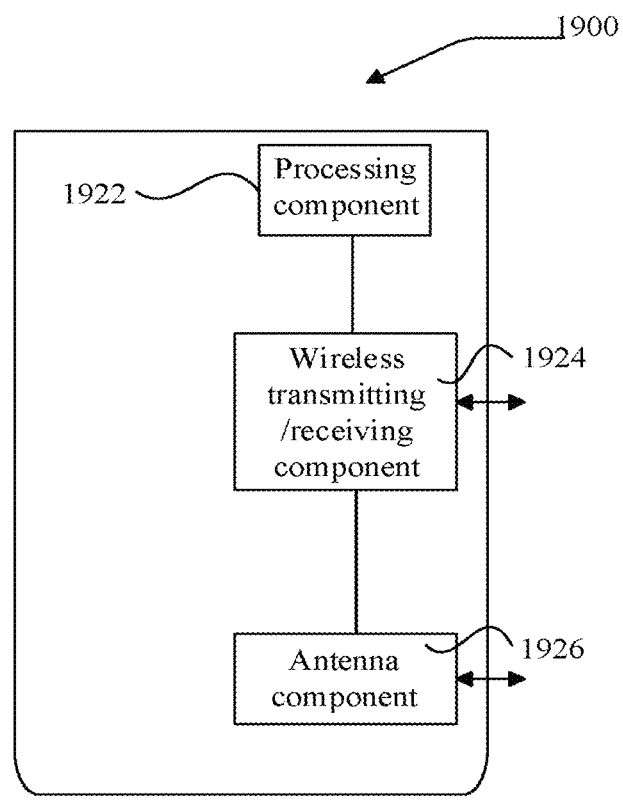
FIG. 19 is a block diagram of an apparatus suitable for receiving information as shown in an exemplary embodiment of the disclosure.

FIG. 19 is a block diagram illustrating an apparatus suitable for multiplexing transmission of information according to an exemplary embodiment. The apparatus 1900 may be provided as a base station. Referring to FIG. 19, the apparatus 1900 includes a processing component 1922, a wireless transmitting/receiving component 1924, an antenna component 1926 and a specific signal processing part of a wireless interface. The processing component 1922 may further include one or more processors.

One of the processors in the processing component 1922 may be configured to receive a plurality of PUSCH transmissions, determine a PUSCH for multiplexing transmission of UCI according to a selection criterion, and receive the UCI from the determined PUSCH.

In the exemplary embodiment, a non-transitory computer-readable storage medium storing instructions is further provided. The above instructions may be executed by the processing component 1922 of the apparatus 1900 to implement the above method for receiving information. For example, the non-transitory computer-readable storage medium may be a Read Only Memory (ROM), a Random Access Memory (RAM), a CD-ROM, a magnetic tape, a floppy disc, an optical data storage device, and the like.

For the apparatus embodiments, reference will now be made in part to the description of the method embodiments since the apparatus embodiments substantially correspond to the method embodiments. The apparatus embodiments described above are merely illustrative. The units illustrated as separate elements may or may not be physically separate. The elements shown as units may or may not be physical units, i.e., may be arranged in one place, or may be distributed in a plurality of network units. Some or all of the modules may be selected according to actual needs to achieve the solutions of the embodiments. Those ordinarily skilled in the art would understand and practice without involving any inventive effort.

It should be noted that in the disclosure, relational terms such as "first", "second" and the like are used only to distinguish one entity or operation from another entity or operation without necessarily requiring or implying any such actual relationship or order between such entities or operations. The terms "includes", "including" or any other variations thereof are intended to cover a non-exclusive inclusion, such that a process, method, article, or equipment that includes a list of elements not only includes those elements but also may include other elements not expressly listed or inherent to such process, method, article, or equipment. Under the condition of no more limitations, an element defined by statement "including a/an . . . " does not exclude existence of another element that is the same in a process, method, object or device including the element.

Other embodiments of the disclosure will readily occur to those skilled in the art upon consideration of the specification and practice of the disclosure disclosed herein. The application is intended to cover any variation, use or adaptation of the disclosure, which follows the general principles of the disclosure and includes common knowledge or conventional technical means in the technical field not disclosed in the disclosure. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A method for multiplexing transmission of information, the method being applicable to a single-carrier scenario and being implemented by User Equipment (UE), the method comprising:

selecting a Physical Uplink Shared Channel (PUSCH) for multiplexing transmission of Uplink Control Information (UCI) carried in a Physical Uplink Control Channel (PUCCH) based on a selection criterion and dropping the PUCCH when the PUCCH and a plurality of PUSCHs have an overlapping portion in time-domain, wherein the PUCCH and the plurality of PUSCHs are within a slot on a same carrier; and performing multiplexing transmission by multiplexing the UCI and transmission content of the selected PUSCH in the selected PUSCH, wherein selecting the PUSCH for the multiplexing transmission of the UCI carried in the PUCCH based on the selection criterion further comprises:

determining the selection criterion based on a type of the UCI and corresponding relationships between types of UCI and different selection criteria; and selecting a PUSCH as the PUSCH for the multiplexing transmission of the UCI based on the determined selection criterion.

2. The method according to claim 1, further comprising:

receiving the selection criterion or the corresponding relationships between types of UCI and different selection criteria from a base station; or agreeing the selection criterion or the corresponding relationships between types of UCI and different selection criteria with a base station.

3. A non-transitory computer-readable storage medium that stores computer instructions thereon that, when executed by a processor, implement the method for multiplexing transmission of information according to claim 1.

4. A method for receiving information, the method being applicable to a single-carrier scenario and being implemented by a base station, the method comprising:

receiving a plurality of Physical Uplink Shared Channel (PUSCH) transmissions;

determining a PUSCH for multiplexing transmission of Uplink Control Information (UCI) carried in a Physical Uplink Control Channel (PUCCH) based on a selection criterion and determining to drop the PUCCH when the plurality of PUSCHs and the PUCCH within a slot on a same carrier have an overlapping portion in time-domain; and receiving the UCI from the determined PUSCH, wherein the selection criterion is determined based on a type of the UCI and corresponding relationships between types of UCI and different selection criteria; and a PUSCH is selected as the PUSCH for the multiplexing transmission of the UCI based on the selection criterion.

5. The method according to claim 4, further comprising:

determining the selection criterion and sending the selection criterion to User Equipment (UE);

determining the corresponding relationships between types of UCI and different selection criteria and sending the corresponding relationships between types of UCI and different selection criteria to UE; or agreeing the selection criterion or the corresponding relationships between types of UCI and different selection criteria with UE.

6. An apparatus for receiving information that is applicable to a base station, the apparatus comprising:

a processor; and a memory that is, configured to store instructions executable by the processor;

wherein the processor is configured to implement operations of the method of claim 4.

7. The apparatus according to claim 6, wherein the processor is further configured to:

determine the selection criterion and send the selection criterion to User Equipment (UE);

determine the corresponding relationships between types of UCI and different selection criteria and send the corresponding relationships between types of UCI and different selection criteria to UE; or agree the selection criterion or the corresponding relationships between types of UCI and different selection criteria with UE.

8. A non-transitory computer-readable storage medium that stores computer instructions thereon that, when executed by a processor, implement the method for receiving information according to claim 4.

9. An apparatus for multiplexing transmission of information, the method being applicable to a single-carrier scenario and being implemented by User Equipment (UE), the apparatus comprising:

a processor; and a memory that is configured to store instructions executable by the processor, wherein the processor is configured to:

select a Physical Uplink Shared Channel (PUSCH) for multiplexing transmission of Uplink Control Information (UCI) carried in a Physical Uplink Control Channel (PUCCH) based on a selection criterion and drop the PUCCH when the PUCCH and a plurality of PUSCHs have an overlapping portion in time-domain, wherein the PUCCH and the plurality of PUSCHs are within a slot on a same carrier; and perform multiplexing transmission by multiplexing the UCI and transmission content of the selected PUSCH in the selected PUSCH, wherein the processor is further configured to:

determine the selection criterion based on a type of the UCI and corresponding relationships between types of UCI and different selection criteria; and select a PUSCH as the PUSCH for the multiplexing transmission of the UCI based on the determined selection criterion.

10. The apparatus according to claim 9, wherein the processor is further configured to:

receive the selection criterion or the corresponding relationships between types of UCI and different selection criteria from a base station; or agree the selection criterion or the corresponding relationships between types of UCI and different selection criteria with a base station.

* * * * *